UNITED STATES PATENT OFFICE.

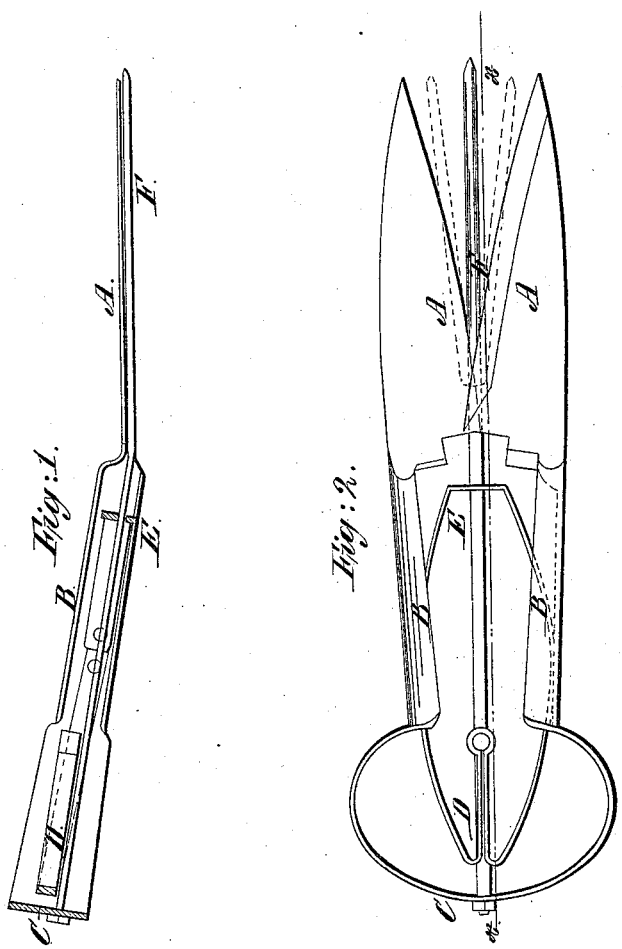

GEORGE F. JOHNSON, OF MARSHALL, IOWA.

IMPROVEMENT IN SHEEP-SHEARS.

Specification forming part of Letters Patent No. 40,170, dated October 6, 1863.

*To all whom it may concern:*

Be it known that I, GEORGE F. JOHNSON, of Marshall, in the county of Henry and State of Iowa, have invented a new and useful Improvement in Sheep-Shears; and I do hereby declare that the following is a full, clear, and exact description of the same, reference being had to the accompanying drawings, making a part of this specification, in which—

Figure 1 is a longitudinal section of my invention, taken in the line $x$ $x$, Fig. 2; Fig. 2, a plan or top view of the same.

Similar letters of reference indicates corresponding parts in the two figures.

This invention consists in the employment or use of a guard attached to an ordinary sheep-shears in such a manner that the animal cannot be cut during the operation of shearing.

To enable those skilled in the art to fully understand and construct my invention, I will proceed to describe it.

A A represent the two blades of a pair of sheep-shears; B B, the handles connected by a spring, C; D, a bent or double V-spring, the ends of which are attached to the back part of the handles B B; and E a V-shaped spring, which is attached to the handles at about their center. The springs D E have a tendency to keep the blades A A of the shears distended or forced apart.

F represents a rod, the back end of which is fitted centrally in the spring C, said rod passing through the center of the spring E, the latter serving as a guide for the rod F. This rod F passes along below the blades A A, the latter moving over the former, and the front end of the rod projects a trifle beyond the points of the blades A A.

By this arrangement it will be seen that in using the shears the point of the rod F will rest upon the skin of the animal, and serve as a perfect guard, effectually preventing the skin from passing or entering between the blades.

I would remark that the rod or guard F may be forked or provided with prongs directly under the blades A A, as indicated by the dotted lines in Fig. 2. This, however, may not be any improvement. The single rod seems to operate well and answer every purpose.

Having thus described my invention, what I claim as new, and desire to secure by Letters Patent as an improved article of manufacture, is—

A sheep-shears provided with a rod or guard, F, substantially as herein set forth.

GEO. F. JOHNSON.

Witnesses:
W. A. VAN DOREN,
SAMUEL G. OWEN.